United States Patent
Harada

(10) Patent No.: US 10,986,247 B2
(45) Date of Patent: Apr. 20, 2021

(54) COMMUNICATION APPARATUS, DATA TRANSFER APPARATUS, AND METHODS OF CONTROLLING THEM

(71) Applicant: CANON KABUSHIKI KAISHA, Tokyo (JP)

(72) Inventor: Sayaka Harada, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/299,347

(22) Filed: Mar. 12, 2019

(65) Prior Publication Data
US 2019/0289166 A1 Sep. 19, 2019

(30) Foreign Application Priority Data
Mar. 14, 2018 (JP) .............................. JP2018-047182

(51) Int. Cl.
*H04N 1/327* (2006.01)
*H04N 1/00* (2006.01)
(52) U.S. Cl.
CPC ..... *H04N 1/32776* (2013.01); *H04N 1/00095* (2013.01); *H04N 2201/0084* (2013.01)
(58) Field of Classification Search
CPC ........... H04N 1/32776; H04N 1/00095; H04N 2201/0084; H04N 5/23203; H04W 36/0011; H04W 48/18; H04W 48/16; H04W 76/10; H04W 4/80
See application file for complete search history.

(56) References Cited

U.S. PATENT DOCUMENTS

| | | | |
|---|---|---|---|
| 2009/0135307 A1* | 5/2009 | Kurita | H04N 21/41407 348/729 |
| 2012/0209946 A1* | 8/2012 | McClure | H04L 41/0893 709/217 |
| 2015/0126117 A1* | 5/2015 | Wong | H04W 12/003 455/41.2 |

FOREIGN PATENT DOCUMENTS

JP 2014-131101 A 7/2014

* cited by examiner

*Primary Examiner* — Mekonnen D Dagnew
(74) *Attorney, Agent, or Firm* — Cowan, Liebowitz & Latman, P.C.

(57) ABSTRACT

A communication apparatus that communicates with a data transfer apparatus using a plurality of communication methods that include a first communication method with which the communication device is unable to connect to a second network while connected to the data transfer apparatus via a first network, and a second communication method with which the communication device is able to connect to the second network while connected to the data transfer apparatus, executes a communication application for data communication, and controls the communication device. While the communication apparatus is executing the communication application and is connected to the data transfer apparatus using the first communication method, the communication controller controls the communication device so as to switch from the first communication method to the second communication method upon the state of the communication application transitioning to a background state.

10 Claims, 12 Drawing Sheets

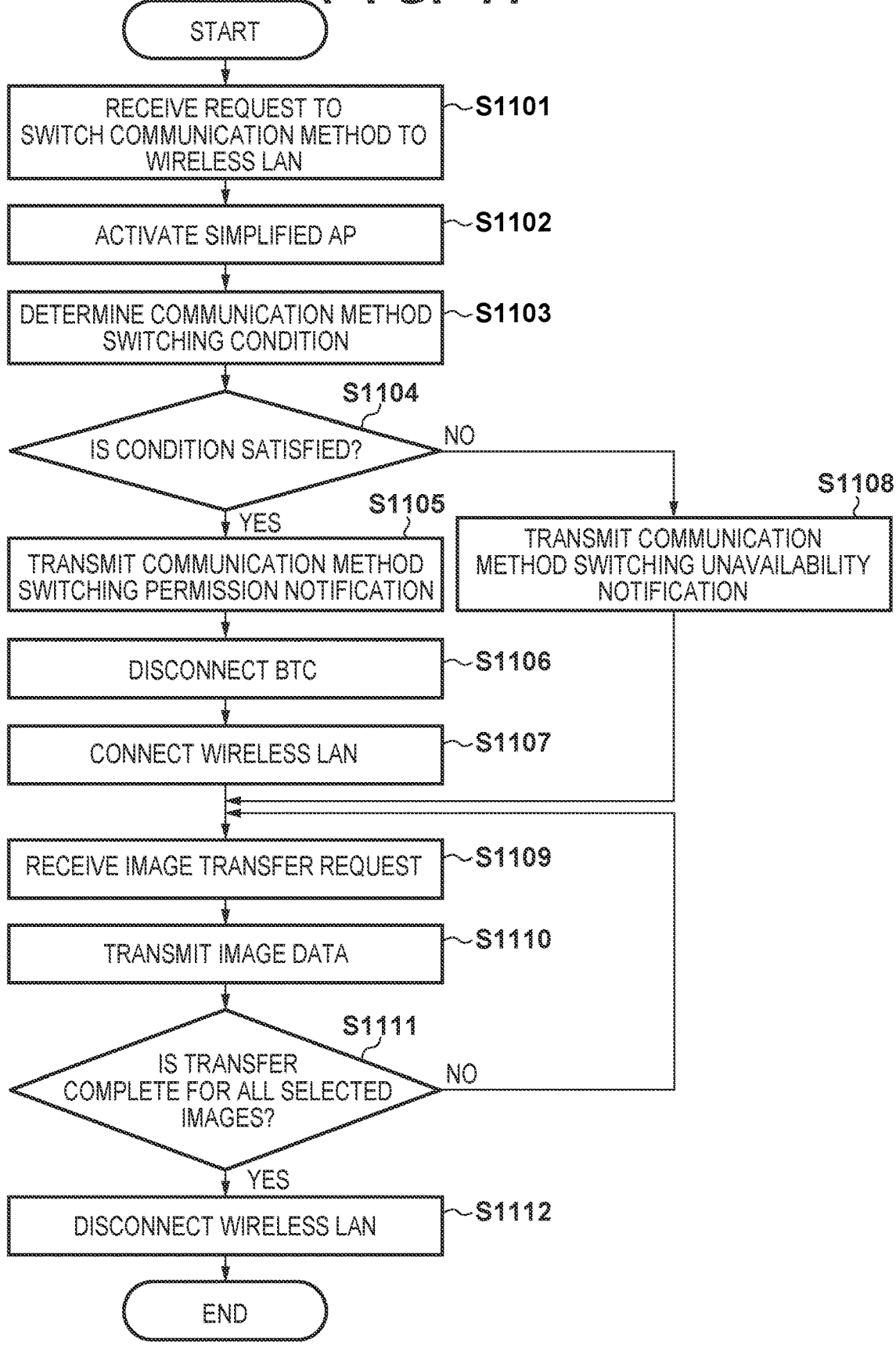

COMMUNICATION APPARATUS, DATA TRANSFER APPARATUS, AND METHODS OF CONTROLLING THEM

BACKGROUND OF THE INVENTION

Field of the Invention

The present invention relates to a communication apparatus, data transfer apparatus and methods of controlling them, particularly relates to communication control techniques when transferring data.

Description of the Related Art

Image capturing apparatuses in recent years, such as digital cameras, are equipped with a wireless communication function such as a wireless LAN (Local Area Network) or Bluetooth (registered trademark), and can connect to a communication apparatus such as a smart device, using the wireless communication function. Also, in recent years, some digital cameras are equipped with a simplified access point function (a simplified AP function). Upon the simplified AP function of a digital camera being activated, a smart device detects the digital camera as an access point, and the smart device can join a network formed by the digital camera.

A relay apparatus that has a typical AP function, such as a router, can connect to a different network such as the Internet. However, the simplified AP function of a digital camera does not allow a smart device to connect to a different network. Therefore, even if a smart device joins a network formed by a digital camera using the simplified AP function, the smart device cannot perform communication via a different network such as the Internet.

Here, it is envisaged that a plurality of applications are installed in a smart device, and the plurality of applications are used while being switched from one to another. If this is the case, the plurality of applications cannot be operated at the same time, and therefore, an application that is currently used needs to be transitioned to a background state when another application is to be used. When an application is in a background state, the user cannot check the operation state of the application. Therefore, there is the possibility of the application performing processing that is not intended by the user. Japanese Patent Laid-Open No. 2014-131101 proposes a technique for, if an application transitions to a background state, detecting that there is no need to perform communication, and powering off the apparatus.

In recent years, an increased number of users upload images captured using a digital camera or the like to an SNS (Social Networking Service), and it is also envisaged that a user transfers an image from a digital camera while uploading the image to an SNS. However, according to Japanese Patent Laid-Open No. 2014-131101, once an SNS application transitions to a background state, it is unable to connect to the Internet. Therefore, it is impossible to use a smart device to, for example, upload an image to an SNS while retrieving an image from a digital camera that is connected to the smart device using the simplified AP function.

SUMMARY OF THE INVENTION

The present invention has been made in consideration of the aforementioned problems, and realizes techniques that enable a communication apparatus to connect to a different network while data is transferred from a data transfer apparatus to the communication apparatus.

In order to solve the aforementioned problems, the present invention provides a communication apparatus that wirelessly connects to a data transfer apparatus to perform communication therewith, comprising: a communication device configured to communicate with the data transfer apparatus using a plurality of communication methods that include a first communication method with which the communication device is unable to connect to a second network while connected to the data transfer apparatus via a first network, and a second communication method with which the communication device is able to connect to the second network while connected to the data transfer apparatus; a processor configured to execute a communication application for data communication; and a communication controller configured to control the communication device, wherein, while the communication apparatus is executing the communication application and is connected to the data transfer apparatus using the first communication method, the communication controller controls the communication device so as to switch from the first communication method to the second communication method upon the state of the communication application transitioning to a background state.

In order to solve the aforementioned problems, the present invention provides a data transfer apparatus comprising: a communication unit configured to be able to communicate with a communication apparatus using a plurality of communication methods that include a first communication method with which the data transfer apparatus is unable to connect to a second network while connected to the communication apparatus via a first network, and a second communication method with which the data transfer apparatus is able to connect to the second network while connected to the communication apparatus; a control unit configured to connect to the communication apparatus using one of the plurality of communication methods, and transfer data to the communication apparatus; and a determination unit configured to perform determination regarding a condition for switching between the plurality of communication methods, upon receiving a request for communication method switching from the communication apparatus, wherein, upon the determination unit determining that the condition is satisfied, the control unit transmits, to the communication apparatus, a notification indicating that the communication method switching is permitted, and upon the determination unit determining that the condition is not satisfied, the control unit transmits, to the communication apparatus, a notification indicating that the communication method switching is not permitted.

In order to solve the aforementioned problems, the present invention provides a method of controlling a communication apparatus having a communication device configured to communicate with a data transfer apparatus using a plurality of communication methods that include a first communication method with which the communication device is unable to connect to a second network while connected to the data transfer apparatus via a first network, and a second communication method with which the communication device is able to connect to the second network while connected to the data transfer apparatus, the method comprising: executing a communication application for data communication; and controlling the communication device, wherein the controlling is performed such that, while the communication apparatus is executing the communication application and is connecting to the data transfer apparatus using the first communication method, the communication device is controlled so as to switch from the first communication method to the second communication method upon the state of the communication application transitioning to a background state.

In order to solve the aforementioned problems, the present invention provides a method of controlling a data transfer apparatus having: a communication unit configured to be able to communicate with a communication apparatus using a plurality of communication methods that include a first communication method with which the data transfer apparatus is unable to connect to a second network while connected to the communication apparatus via a first network, and a second communication method with which the data transfer apparatus is able to connect to the second network while connected to the communication apparatus; a control unit configured to connect to the communication apparatus using one of the plurality of communication methods, and transfer data to the communication apparatus; and a determination unit configured to perform determination regarding a condition for switching between the plurality of communication methods, upon receiving a request for communication method switching from the communication apparatus, the method comprising: transmitting, to the communication apparatus, a notification that indicates permission to perform the communication method switching, upon the determination unit determining that the condition is satisfied, and transmitting, to the communication apparatus, a notification indicating that the communication method switching is not permitted, upon the determination unit determining that the condition is not satisfied.

In order to solve the aforementioned problems, the present invention provides a non-transitory computer-readable storage medium storing a program for causing a computer to function as a communication apparatus that wirelessly connects to a data transfer apparatus to perform communication therewith, comprising: a communication device configured to communicate with the data transfer apparatus using a plurality of communication methods that include a first communication method with which the communication device is unable to connect to a second network while connected to the data transfer apparatus via a first network, and a second communication method with which the communication device is able to connect to the second network while connected to the data transfer apparatus; a processor configured to execute a communication application for data communication; and a communication controller configured to control the communication device, wherein, while the communication apparatus is executing the communication application and is connected to the data transfer apparatus using the first communication method, the communication controller controls the communication device so as to switch from the first communication method to the second communication method upon the state of the communication application transitioning to a background state.

In order to solve the aforementioned problems, the present invention provides a non-transitory computer-readable storage medium storing a program for causing a computer to function as a data transfer apparatus comprising: a communication unit configured to be able to communicate with a communication apparatus using a plurality of communication methods that include a first communication method with which the data transfer apparatus is unable to connect to a second network while connected to the communication apparatus via a first network, and a second communication method with which the data transfer apparatus is able to connect to the second network while connected to the communication apparatus; a control unit configured to connect to the communication apparatus using one of the plurality of communication methods, and transfer data to the communication apparatus; and a determination unit configured to perform determination regarding a condition for switching between the plurality of communication methods, upon receiving a request for communication method switching from the communication apparatus, wherein, upon the determination unit determining that the condition is satisfied, the control unit transmits, to the communication apparatus, a notification indicating that the communication method switching is permitted, and upon the determination unit determining that the condition is not satisfied, the control unit transmits, to the communication apparatus, a notification indicating that the communication method switching is not permitted.

According to the present invention, it is possible to enable a communication apparatus to connect to a different network while data is transferred from a data transfer apparatus to the communication apparatus.

Further features of the present invention will become apparent from the following description of exemplary embodiments (with reference to the attached drawings).

BRIEF DESCRIPTION OF THE DRAWINGS

FIG. 11 is a flowchart for image transfer processing that is performed by the digital camera according to the second embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

The following describes a system in which a digital camera and a smart device are respectively employed as a data transfer apparatus and a communication apparatus according to the present invention, and that enables an application in the smart device to connect to a different network such as the Internet while transferring an image from the digital camera, in a background state.

Configuration of Digital Camera 100

Figure 1A:
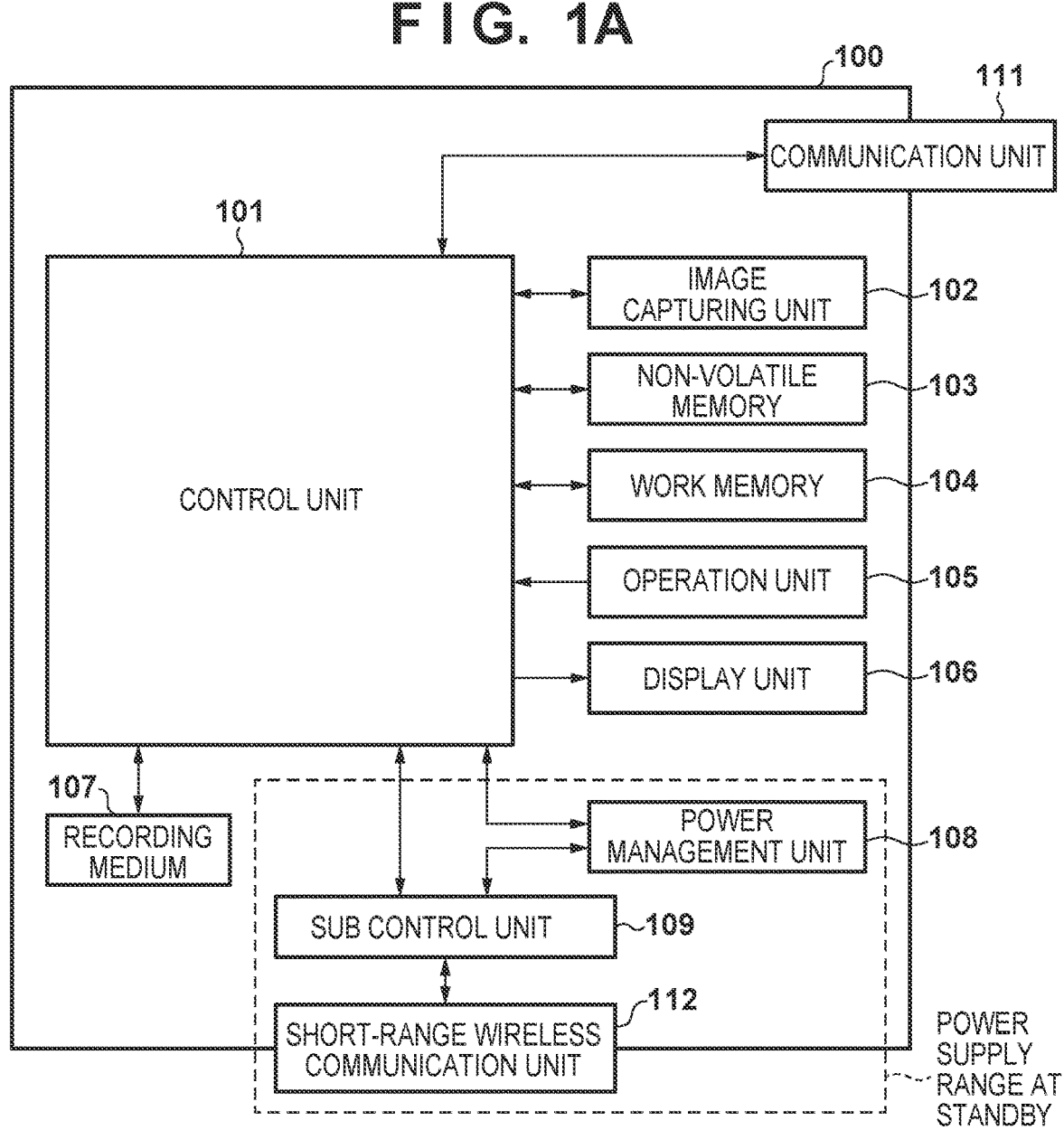
FIG. 1A is a block diagram showing a configuration of a digital camera according to a present embodiment.
Figure 1B:
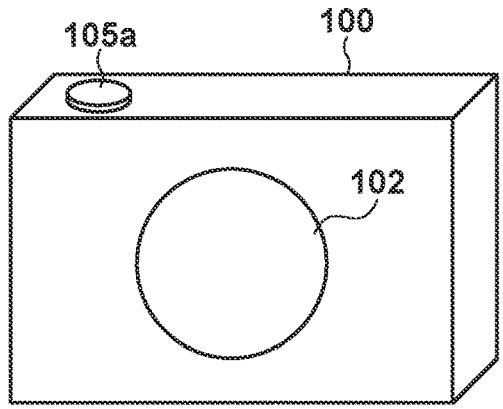
FIGS. 1B and 1C are a front view and a back view showing the configuration of the digital camera according to the present embodiment.
Figure 1C:
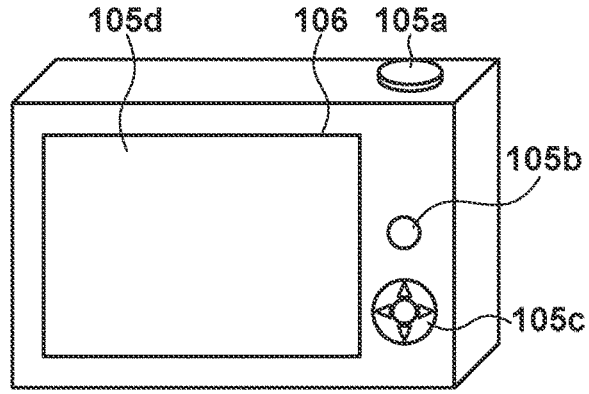

First, the configuration and functions of the digital camera 100 of the present embodiment will be described with reference to FIGS. 1A to 1C.

Note that, in the present embodiment, a digital camera that can capture a still image and a moving image is described as an example of the data transfer apparatus. However, the data transfer apparatus is not limited to a digital camera, and may be a tablet device equipped with a camera function, an information processing apparatus such as a personal computer, a surveillance camera, a medical camera, or the like.

A control unit 101 is an arithmetic processing unit (CPU), which comprehensively controls the overall digital camera 100, and implements communication processing and control processing (to be described later) by executing programs stored in a nonvolatile memory 103 (to be described later). Note that a plurality of pieces of hardware may control the overall apparatus by sharing processes instead of the control unit 101 controlling the overall apparatus.

An image capturing unit 102 includes a lens group including a zoom lens and a focus lens, and a shutter having a stop function. The image capturing unit 102 also includes an image sensor formed from a CCD, a CMOS device, or the like which converts an object image into electrical signals, and an A/D converter which converts analog image signals output from the image sensor into digital signals. Under the control of the control unit 101, the image capturing unit 102 converts object image light formed by a lens included in the image capturing unit 102 into electrical signals, using imaging elements, performs noise reduction processing or the like, and outputs image data consisting of digital signals.

The control unit 101 has an image processing function, and performs pixel interpolation, resize processing such as size reduction, and color conversion processing on image data captured by the image capturing unit 102. The control unit 101 also performs compression encoding complying with JPEG or the like, on still image data that has undergone the above-described processing, or performs encoding complying with a moving image compression method such as MPEG2 or H.264, on moving image data, to generate an image file, and records the image file on a recording medium 110. The digital camera 100 according to the present embodiment records image data on the recording medium 110 according to the DCF (Design rule for Camera File system) standards. The control unit 101 also performs predetermined arithmetic processing using captured image data, and performs AF (Auto Focus) processing, AE (Auto Exposure) processing, and so on by controlling the focus lens, the stop, and the shutter of the image capturing unit 102 based on the results of arithmetic processing.

The nonvolatile memory 103 is an electrically erasable/recordable memory, and, for example, an EEPROM is used. Constants, programs, and the like for the operation of the control unit 101 are recorded in the nonvolatile memory 103. In this case, the programs are those for executing processing at the time of a remote shooting, which will be described later in the present embodiment.

A work memory 104 is used as a work area where constants and variables for the operation of the control unit 101, programs read out from the nonvolatile memory 103, and the like are to be loaded. The work memory 104 is also used as a buffer memory for temporarily holding the image data captured by the image capturing unit 102 or an image display memory for a display unit 106.

An operation unit 105 is constituted by operation members such as various types of switches and buttons, and a touch panel, which accept various types of operations from the user. The operation unit 105 includes, for example, a shutter button 105a for performing image shooting, a reproduction button 105b for performing a reproduction of shot images, and four-directional keys 105c constituted by up, down, left and right buttons for various settings of the camera, as shown in FIGS. 1B and 1C. The operation unit 105 also includes a touch panel 105d that is formed integrally with the display unit 106 that will be described later. The operation unit 105 also includes, for example, a connection button that is dedicated to the task of starting communication with a smart device 200, which is an external apparatus and will be described later.

The shutter button 105a is turned on to generate a first shutter switch signal SW1 when the shutter button 105a is operated halfway, that is, half-pressed (a shooting preparation instruction). Upon receiving the first shutter switch signal SW1, the control unit 101 controls the image capturing unit 102 to start an operation such as AF (Automatic Focus) processing, AE (Automatic Exposure) processing, AWB (Automatic White Balance) processing, or EF (Electronic Flash) processing. Also, the shutter button 105a is turned on to generate a second shutter switch signal SW2 when the shutter button 105a is operated completely, that is, full-pressed (a shooting instruction). Upon receiving the second shutter switch signal SW2, the control unit 101 starts a series of shooting operations from reading out a signal from the image capturing unit 102 to writing image data in the recording medium 110.

The display unit 106 displays, for example, a viewfinder image at the time of shooting, a captured image, and characters for a dialogical operation. The display unit 106 is, for example, a display device such as a liquid crystal display or an organic EL display. The display unit 106 may be formed integrally with the digital camera 100, or an external apparatus connected to the digital camera 100. The digital camera 100 need only be connectable to the display unit 106 and have the function of controlling display performed by the display unit 106.

Image data output from the image capturing unit 102 is recorded on the recording medium 110, and an image file that has been recorded thereon by the control unit 101 is read out from the recording medium 110. The recording medium 110 may be a memory card or a hard disk drive that is to be coupled to the digital camera 100, or a flash memory or a hard disk drive that is built into the digital camera 100. The digital camera 100 has at least a method for accessing the recording medium 110.

A power management unit 108 manages power supplied to each unit in the digital camera 100. Instead of supplying power to the entire digital camera 100, the power management unit 108 may apply power only to a sub control unit 109 and a short-range wireless communication unit 112 that will be described later. In the following description, a state in which power is supplied to the entire digital camera 100 is referred to as a power on state, a state in which power is supplied only to the sub control unit 109 and the short-range wireless communication unit 112 is referred to as a standby state, and a state in which power is not supplied to the digital camera 100 is referred to as a power off state. In the standby state, the power consumption of the digital camera 100 can be kept at a significantly low level.

A communication unit 111 is an interface for communicably connecting to an external apparatus such as the smart device 200 (described later). The digital camera 100 according to the present embodiment can exchange data with an external apparatus via the communication unit 111. For example, image data generated in the image capturing unit 102 can be transmitted to an external apparatus via the communication unit 111. Note that, in the present embodiment, the communication unit 111 includes an interface for communication with an external apparatus via a wireless LAN complying with the IEEE 802.11 standards. The control unit 101 implements wireless communication with an external apparatus by controlling the communication unit 111. Note that the communication method is not limited to a wireless LAN, and may include a wireless communication interface such as an infrared communication interface or a wireless USB. Furthermore, the communication unit 111 may employ a wired connection method such as a method using a USB cable, a method using HDMI (registered trademark), or a method using an interface complying with the IEEE 1394 standards.

The short-range wireless communication unit 112 includes, for example, an antenna for wireless communication, a modulation/demodulation circuit for wireless signal processing, and a communication controller. The short-range wireless communication unit 112 outputs modulated wireless signals from the antenna, or demodulates wireless signals received by the antenna, to implement short-range wireless communication complying with the IEEE 802.15 standards (Bluetooth (registered trademark)). In the present embodiment, Bluetooth Low Energy (BLE) version 4.0, which is a low power consumption Bluetooth (registered trademark), is employed to implement communication via Bluetooth (registered trademark). In the following description, Bluetooth (registered trademark) version 3.0 is referred to as BTC (a second communication method), and Low Energy Bluetooth (registered trademark) version 4.0 is referred to as BLE (a third communication method). Communication via Bluetooth (registered trademark) has a smaller communication range (i.e. has a shorter communication distance) than communication via a wireless LAN. Also, communication via Bluetooth (registered trademark) is slower than communication via a wireless LAN. On the other hand, communication via Bluetooth (registered trademark) consumes lower power than communication via a wireless LAN. Compared to BTC, BLE has a lower communication capacity and cannot transmit a large amount of data such as image data.

The digital camera 100 according to the present embodiment can exchange data with an external apparatus such as the smart device 200 connected thereto via the short-range wireless communication unit 112 using BTC. If the digital camera 100 according to the present embodiment receives a shooting command from an external apparatus, for example, the digital camera 100 can perform shooting processing by controlling the image capturing unit 102, and transmit image data generated in the control unit 101 to the external apparatus via the short-range wireless communication unit 112. Also, the digital camera 100 according to the present embodiment can receive/transmit control signals from/to an external apparatus via BLE communication. The sub control unit 109 controls the short-range wireless communication unit 112 to control short-range wireless communication with an external apparatus.

Note that the communication unit 111 of the digital camera 100 according to the present embodiment has an AP mode, in which the communication unit 111 operates as an access point for the infrastructure mode, and a CL mode in which the communication unit 111 operates as a client for the infrastructure mode. As a result of the communication unit 111 operating in the CL mode, the digital camera 100 according to the present embodiment can operate as a CL device for the infrastructure mode. When operating as a CL device, the digital camera 100 can join a network formed by AP devices, by connecting to an AP device in the vicinity of the digital camera 100. As a result of the communication unit 111 operating in the AP mode, the digital camera 100 according to the present embodiment can also operate as an AP, which is a simplified type of AP with limited functions (hereinafter referred to as a "simplified AP"). If the digital camera 100 operates as a simplified AP, the digital camera 100 forms a network by itself. Apparatuses in the vicinity of the digital camera 100 can recognize the digital camera 100 as an AP device, and join the network formed by the digital camera 100. It is envisaged that programs that enable the digital camera 100 to operate as described above are held in the nonvolatile memory 103.

Although the digital camera 100 according to the present embodiment is a type of AP, the digital camera 100 is a simplified AP (employing a first communication method) that does not have a gateway function, which is the function of transferring data received from a CL device to an internet provider or the like. Therefore, even if the digital camera 100 receives data from another device that has joined the network formed by the digital camera 100, the digital camera 100 cannot transfer the data to a network such as the Internet.

Configuration of Smart Device 200

Figure 2A:
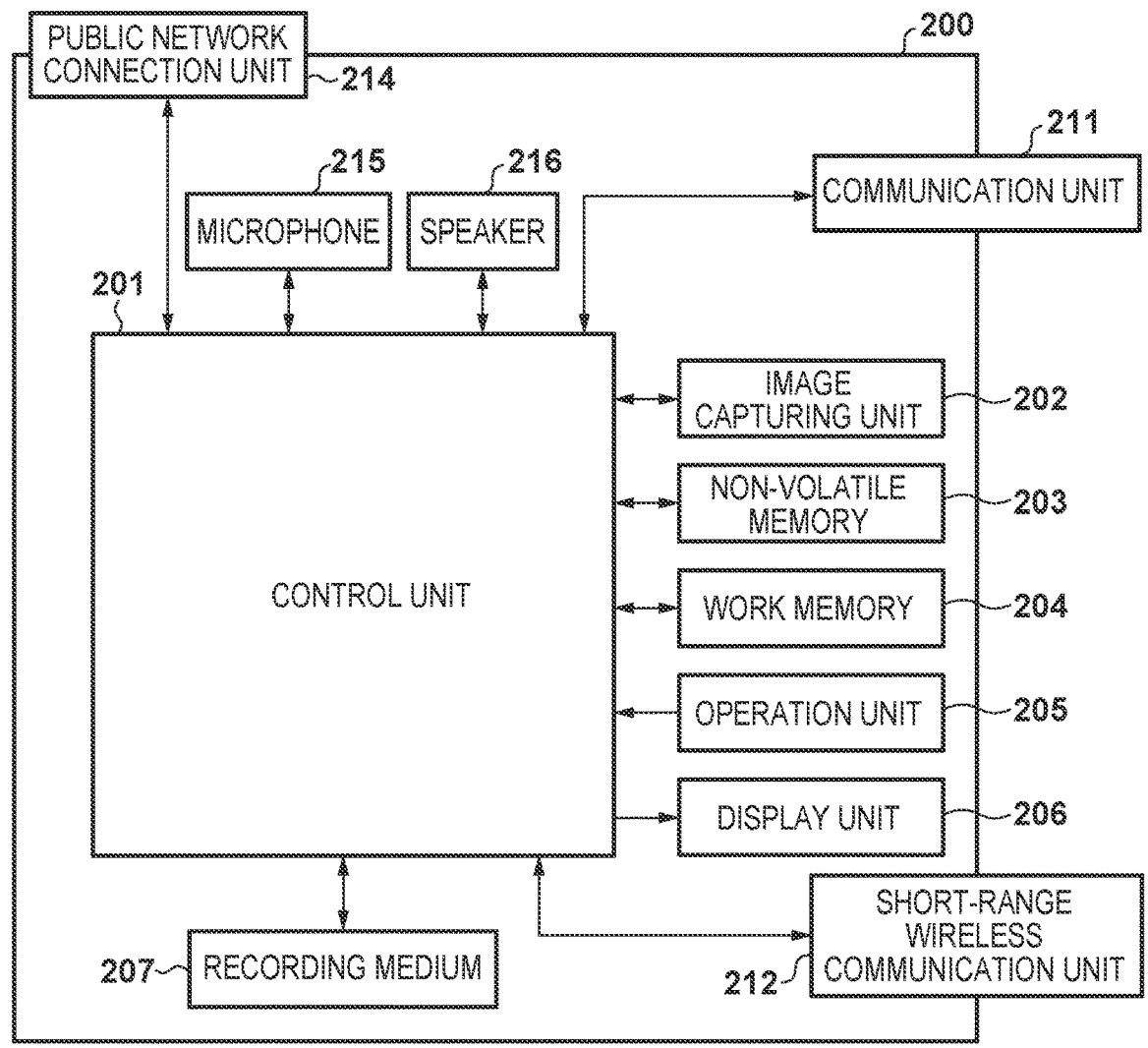
FIGS. 2A and 2B are a block diagram and an external view showing the configuration of a smart device according to the present embodiment.
Figure 2B:
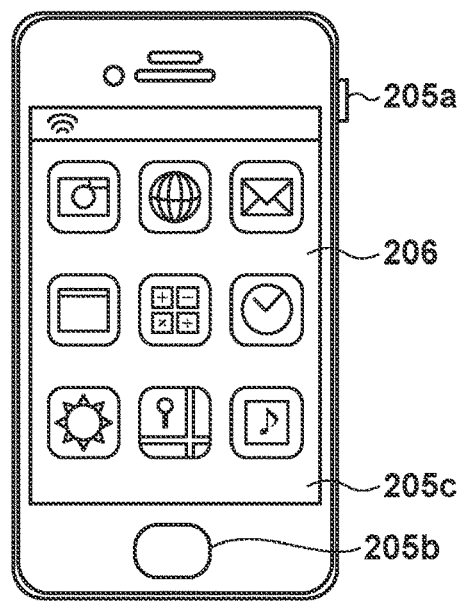

Next, the configuration and functions of the smart device 200 will be described with reference to FIGS. 2A and 2B.

Although the present embodiment describes a smart device as an example of a communication apparatus, the communication apparatus is not limited to a smart device, and may be a digital camera equipped with a wireless function, a smartphone, which is a type of cellular phone, a tablet device, a printer, a television, a personal computer, or a wearable computer such as a smart watch that has the shape of a wristwatch or smart glasses that have the shape of a pair of glasses.

The smart device 200 according to the present embodiment includes a control unit 201, an image capturing unit 202, a nonvolatile memory 203, a work memory 204, an operation unit 205, a display unit 206, a recording medium 210, a communication unit 211, and a short-range wireless communication unit 212. The basic functions of these elements are the same as those of the digital camera 100, and hence a detailed description of them will be omitted.

The nonvolatile memory 203 stores an OS (operating system), which is the basic software that is to be executed by the control unit 201, and applications which implement extended functions in cooperation with this OS. Also, in the present embodiment, the nonvolatile memory 203 stores a camera application that remotely operate the digital camera 100 to implement remote communication control such as an image transfer function and a remote control function, which will be described later.

The smart device 200 implements processing for remote communication control according to the present embodiment by loading software that is provided by the application. Note that the application includes software that is executed when basic functions of the OS installed in the smart device 200 are to be used. Alternatively, the OS in the smart device 200 may include software that is executed to implement processing according to the present embodiment.

The communication unit 211 includes a wireless LAN communication interface for wireless communication with an external apparatus such as the digital camera 100. The control unit 201 implements wireless communication with an external apparatus by controlling the communication unit 211. The communication unit 211 may be configured to be connected directly to the digital camera 100, or connected via an access point. PTP/IP (Picture Transfer Protocol over Internet Protocol) for communication via a wireless LAN may be used as a protocol for data communication, for example. Note that communication with the digital camera 100 is not limited in such a way.

To perform short-range wireless communication with the digital camera 100, the short-range wireless communication unit 212 first needs to connect to the short-range wireless communication unit 112 of the digital camera 100 according to an operation called "pairing", which is performed to establish one-to-one connection for short-range wireless communication. In a pairing operation in the case of BTC, the smart device 200 serves as a master and broadcasts a packet called "Inquiry", for example. Upon the digital camera 100 receiving an Inquiry packet, the digital camera 100 transmits an FHS packet to the master. The master can acquire information regarding a slave from an FHS packet, and establish communication. Also, in a pairing operation, the digital camera 100 serves as a "Peripheral" and performs an operation called "Advertising", using the short-range wireless communication unit 112, which is an operation that is performed to notify devices in the vicinity of the digital camera 100 of its presence. The smart device 200 operates as a "Central", performs a "Scan" operation using the short-range wireless communication unit 212 to discover the digital camera 100, and makes a join request by performing an "Initiating" operation. Thus, connection for short-range wireless communication is established. Note that the term "pairing" may be used exclusively for a Bluetooth connection that involves encryption. However, in the present embodiment, an operation that is performed to establish one-to-one connection using short-range wireless communication is called "pairing", regardless of whether or not encryption is applied.

A public network connection unit 214 is an interface used for wireless communication via a Wide Area Network (WAN), such as 3G or LTE. The smart device 200 can make a telephone call and perform data communication with another device via the public network connection unit 214. When making a telephone call, the control unit 201 inputs and outputs voice signals via a microphone 215 and a loudspeaker 216. In this embodiment, the public network connection unit 214 is not limited to 3G or LTE, and may use another communication method such as WiMAX, ADSL or FTTH. In the present embodiment, the public network connection unit 214 is an antenna, and the control unit 201 can connect to a public network via the antenna. Note that the communication unit 211 and the public network connection unit 214 are not necessarily formed using independent pieces of hardware. For example, both the communication unit 211 and the public network connection unit 214 may be formed using a single antenna.

Next, an external appearance of the smart device 200 will be described. FIG. 2B shows an example of an external appearance of the smart device 200. A power button 205a, a home button 205b, and a touch panel 205c are operation members included in the above-described operation unit 205. The home button 205b is pressed by the user to suspend an application that is being executed, and display, on the display unit 206, a home screen on which the user can select another application.

Image Transfer Processing

Next, the following describes processing that is performed to transfer an image from the digital camera 100 to the smart device 200 by operating a camera application in the smart device 200, with reference to FIGS. 3A to 9.

Functions that can be realized by remotely operating the digital camera 100, using the camera application in the smart device 200, include an image transfer function and a remote control function (shooting/reproduction).

The image transfer function is the function of, by only an operation of the smart device 200, switching connection to the digital camera 100 from a BLE connection (the third communication method) to a wireless LAN connection using a simplified AP (the first communication method), and loading image data held in the digital camera 100 (hereinafter referred to as an in-camera image) to the smart device 200. The remote control function is the function of remotely controlling the digital camera 100 from the smart device 200 to perform a shooting operation and a reproduction operation.

Figure 3C:
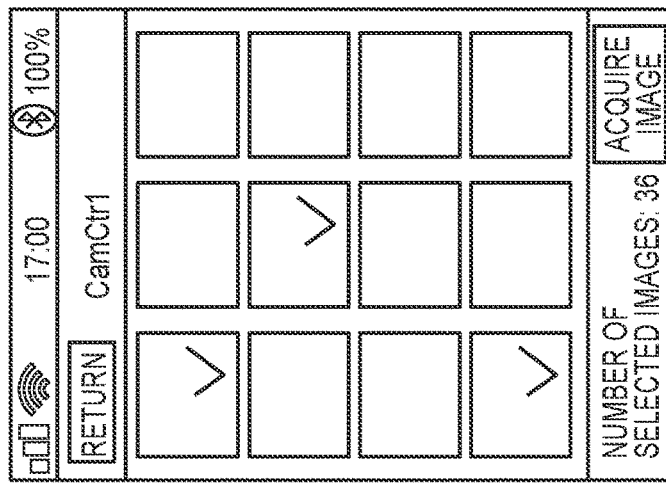
FIGS. 3A to 3F are diagrams illustrating an application screen of the smart device according to the present embodiment.
Figure 3B:
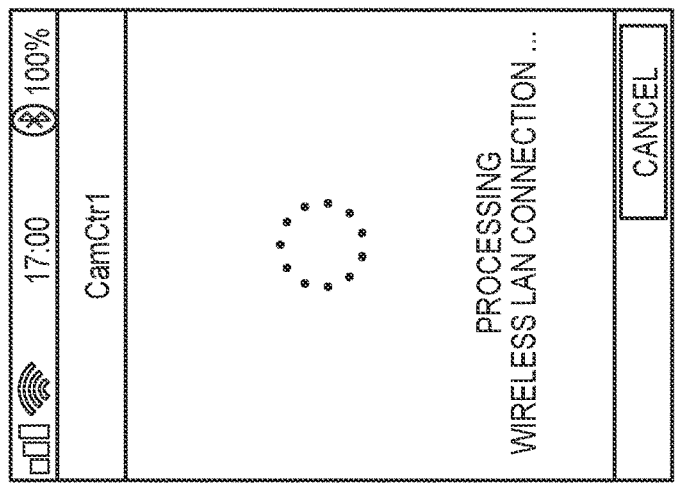
Figure 3A:
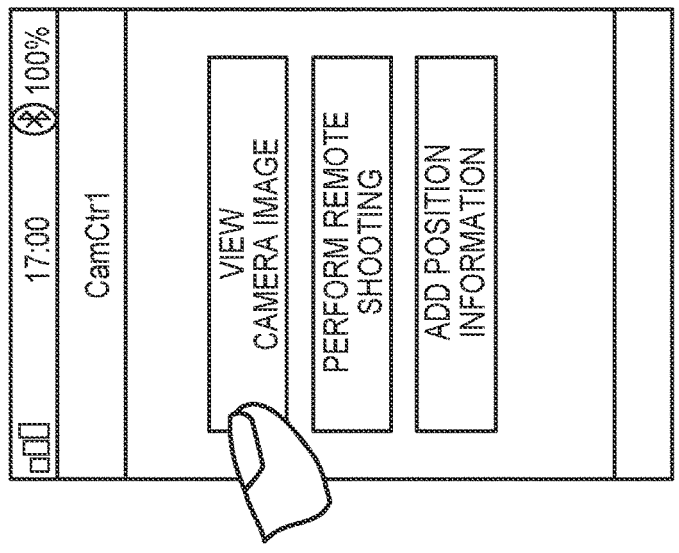
Figure 4:
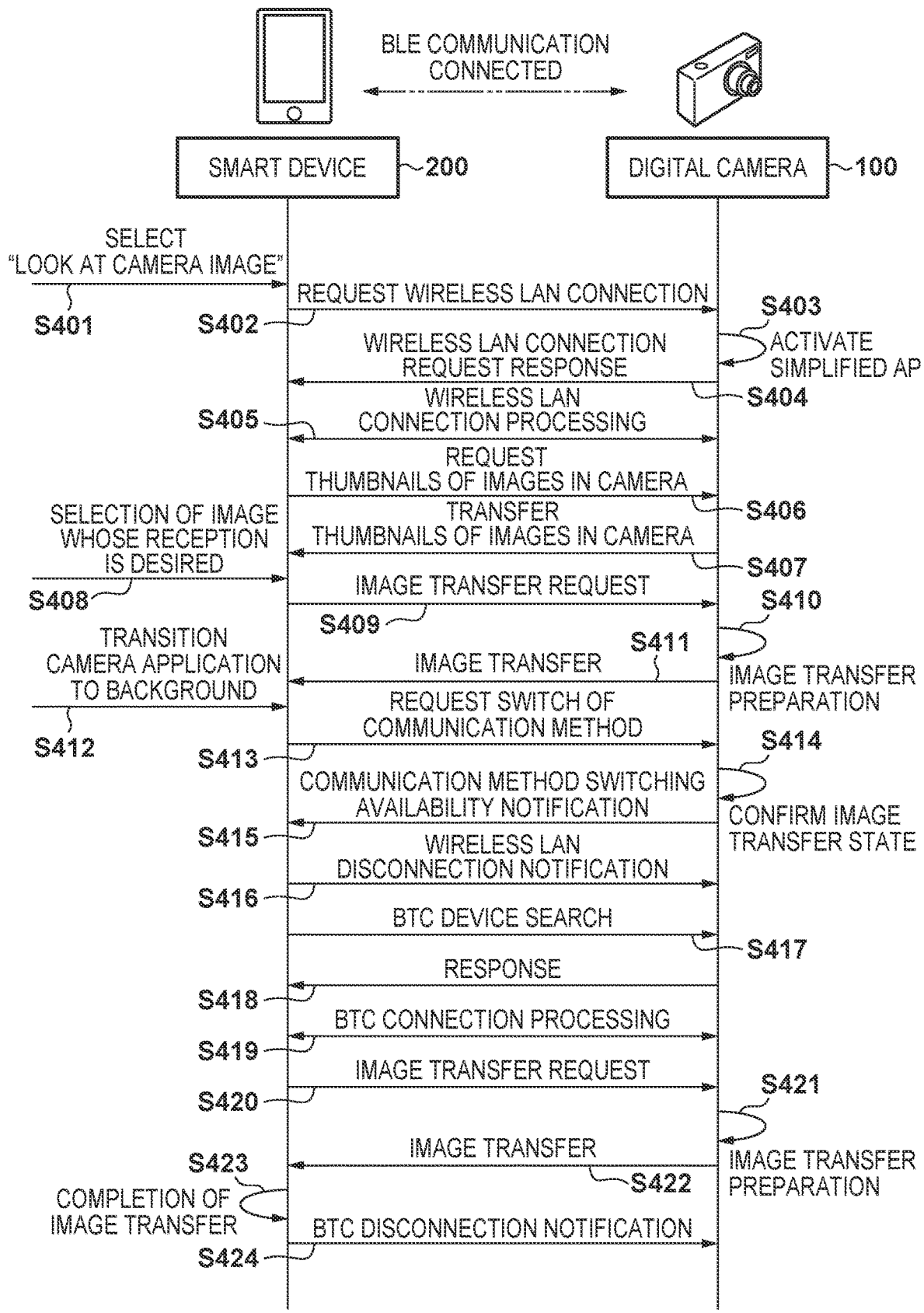
FIG. 4 is a sequence diagram for image transfer processing that is performed between the digital camera and the smart device according to the present embodiment.

FIG. 4 shows a processing sequence according to the present embodiment, through which an image is transferred from the digital camera 100 to the smart device 200. The smart device 200 and the digital camera 100 are constantly connected to each other via BLE. FIG. 3A shows a camera application screen of the smart device 200 when connected to the digital camera 100 via BLE.

Figure 3F:
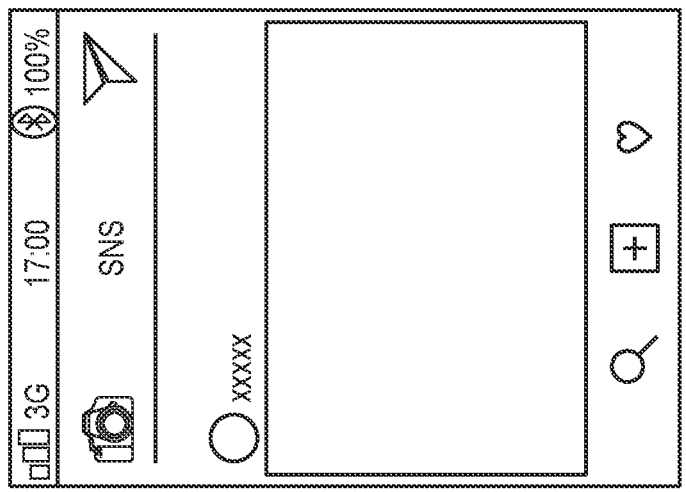
Figure 3E:
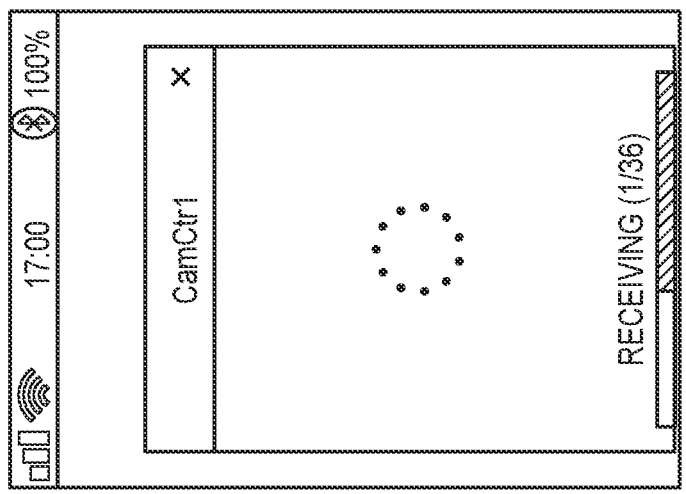
Figure 3D:
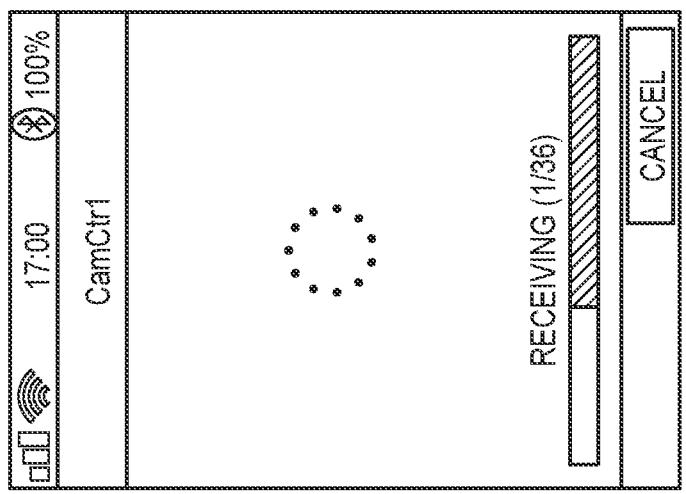

In step S401, upon the user selecting "view images in the camera" from among menu items on the smart device 200, a wireless LAN connection request is transmitted from the smart device 200 to the digital camera 100 in step S402, and wireless LAN connection processing is started. Upon wireless LAN connection processing being started, a screen during BLE connection shown in FIG. 3A is switched to a screen during wireless LAN connection processing shown in FIG. 3B. In step S403, upon the digital camera 100 receiving the wireless LAN connection request, the digital camera 100 activates a simplified AP, and in step S404, the digital camera 100 transmits a response to the wireless LAN connection request, to the smart device 200. In step S405, wireless LAN connection processing is performed between the smart device 200 and the digital camera 100. Upon wireless LAN connection processing being complete, the smart device 200 transmits a request for the thumbnails of in-camera images, to the digital camera 100 in step S406. Upon the digital camera 100 transferring the thumbnails of the in-camera images to the smart device 200 in step S407, an image list screen shown in FIG. 3C is displayed on the smart device 200. In step S408, the user selects an image that the user wishes to load to the smart device 200, from the image list screen, and presses an image acquisition button 221 on the smart device 200. Upon the image acquisition button 221 being pressed by the user, the smart device 200 transmits an image transfer request to the digital camera 100 in step S409. Upon receiving the image transfer request from the smart device 200, the digital camera 100 prepares for image transfer in step S410, and starts image transfer processing in step S411. Processing from step S409 to step S411 is repeatedly performed until all of the images in a transfer waiting are transferred from the digital camera 100 to the smart device 200. FIG. 3D shows an example of a screen during image transfer. The screen shown in FIG. 3D is continuously displayed until all of the images in the transfer waiting are transferred.

In step S412, it is envisaged that the camera application in a foreground state has transitioned to a background state as a result of the user launching another application in the smart device 200 while images are transferred. FIG. 3E shows an example of a screen that is displayed when the camera application has transitioned to the background state. Upon the camera application transitioning to the background state, the smart device 200 transmits a communication method switching request to the digital camera 100 in step S413. In step S414, the digital camera 100 checks the current state of image transfer, and if there is an image that is being transferred, the digital camera 100 does not transmit a communication method switching availability notification until the transfer is complete.

In step S415, after image transfer has been completed, the digital camera 100 transmits a communication method switching availability notification to the smart device 200. In steps S414 and S415, if communication method switching is permitted despite an image being transferred, the image may need to be transferred again after the communication method switching has been completed, and communication method switching may take extra time. Therefore, in the present embodiment, if an image is being transferred, communication method switching is performed after the image transfer has been completed.

Upon receiving the communication method switching availability notification from the digital camera 100 in step S415, the smart device 200 transmits a wireless LAN disconnection notification to the digital camera 100 in step S416. In step S417, the smart device 200, which has transmitted the wireless LAN disconnection notification to the digital camera 100, starts a BTC device search. In step S418, the digital camera 100 responds to the BTC device search, and in step S419, BTC connection processing is performed. Thus, switching from the wireless LAN communication method to the BTC communication method is complete. The smart device 200 transmits an image transfer request via BTC in step S420, and the digital camera 100, which has received the image transfer request from the smart device 200, prepares for image transfer in step S421, and the digital camera 100 transfers images to the smart device 200 in step S422. Processing from step S420 to step S422 is repeatedly performed until all of the images in a transfer waiting are transferred from the digital camera 100 to the smart device 200. Upon image transfer being complete in step S423, the smart device 200 transmits a BTC disconnection notification to the digital camera 100 in step S424, and the BTC connection is cut.

If wireless LAN connection is established using a simplified AP, it is impossible to perform Internet communication, whereas, in the case of BTC, it is possible to continue image transfer while performing Internet communication. After causing the camera application to transition to the background state in step S412, the user can perform Internet communication by launching another application, using mobile data communication such as 3G or LTE communication. Therefore, the user of the smart device 200 can upload an image by operating an SNS application as shown in FIG. 3F, and simultaneously retrieve an image from the digital camera 100 via BTC.

Figure 5:
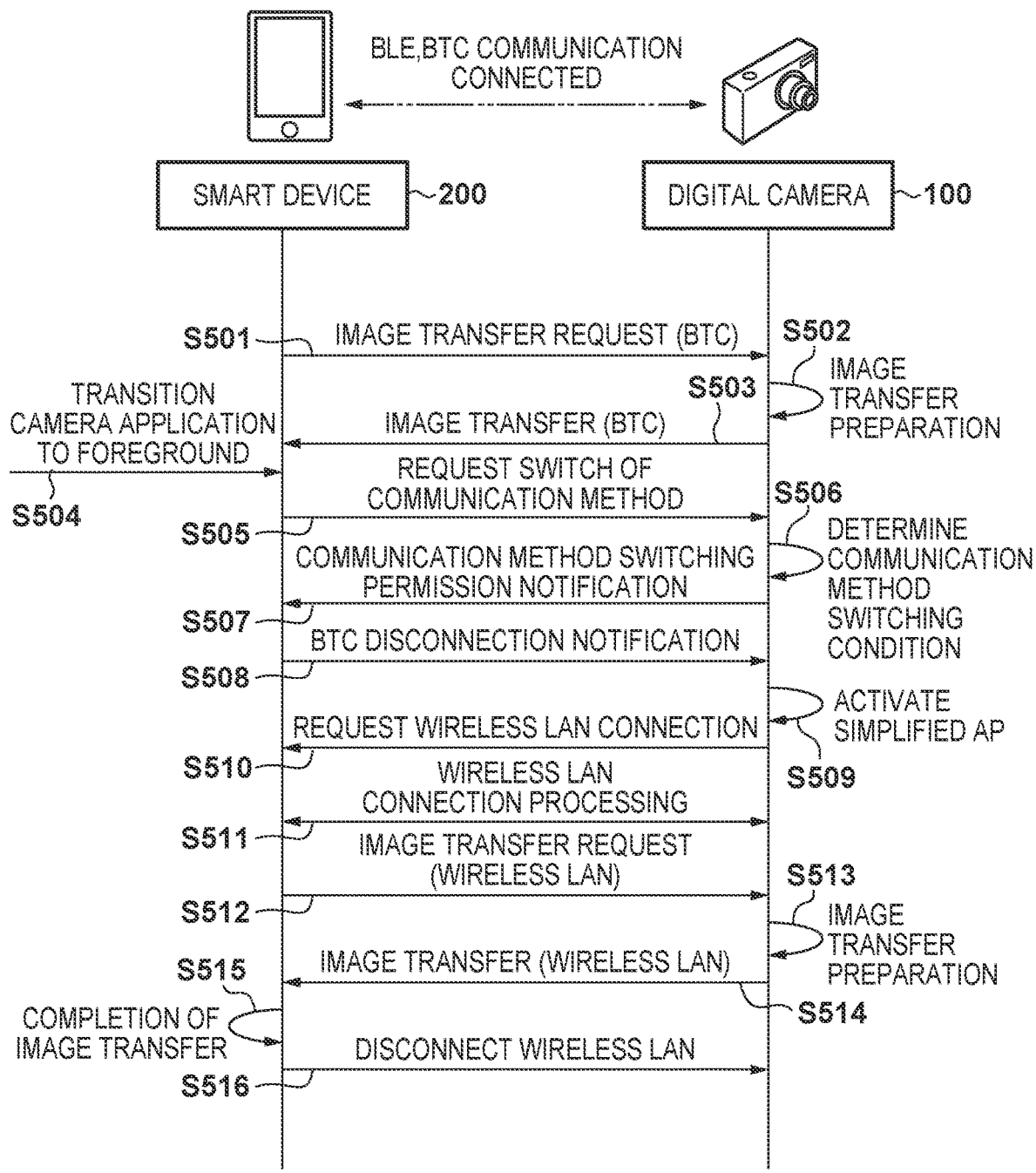
FIG. 5 is a sequence diagram for image transfer processing that is performed between the digital camera and the smart device according to a first embodiment.

FIG. 5 shows an image transfer processing sequence according to the first embodiment, which is performed in a case where the camera application in the smart device 200 returns to the foreground state from the background state. When the camera application is in the background state, image transfer is performed via BTC as described with reference to FIG. 4. BLE is constantly connected so that control signals can be transmitted and received.

In step S501, the smart device 200 transmits an image transfer request to the digital camera 100. In step S502, the digital camera 100, which has received the image transfer request from the smart device 200, prepares for image transfer, and transmits image data to the smart device 200 in step S503. Processing from step S501 to step S503 is repeatedly performed until all of the images in a transfer waiting are transferred. Upon the camera application transitioning to the foreground state in step S504 as a result of a user operation, the smart device 200 transmits a communication method switching request to the digital camera 100 in step S505.

In step S506, the digital camera 100 performs determination regarding a condition for communication method switching. If the condition is satisfied, the digital camera 100 transmits a communication method switching permission notification to the smart device 200 in step S507. Upon receiving the communication method switching permission notification, the smart device 200 transmits a BTC disconnection notification to the digital camera 100 in step S508. Upon the BTC connection being cut, the digital camera 100 activates a simplified AP in step S509. In step S510, the digital camera 100 transmits a wireless LAN connection request to the smart device 200, and in step S511, wireless LAN connection processing is performed. Upon wireless LAN connection processing being complete, the smart device 200 transmits an image transfer request to the digital camera 100 in step S512.

In step S513, the digital camera 100 prepares for image transfer, and performs image data transfer processing in step S514. Processing from step S512 to step S514 is repeatedly performed until all of the images in a transfer waiting are transferred. Upon the digital camera 100 transferring all of the images in the transfer waiting in step S515, the smart device 200 transmits a wireless LAN disconnection notification to the digital camera 100 in step S516.

Figure 6:
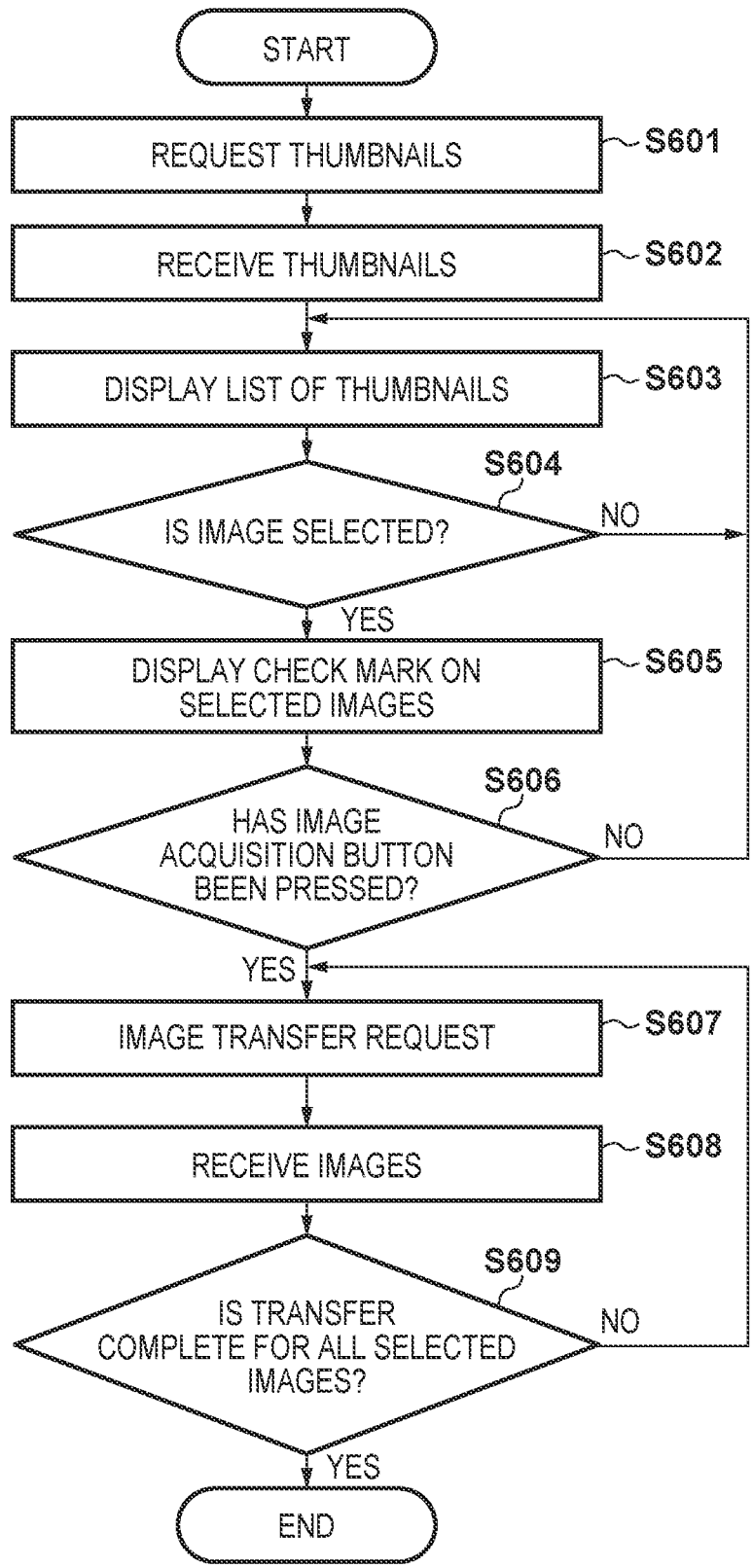
FIG. 6 is a flowchart for image transfer processing that is performed by the smart device according to the first embodiment.

FIG. 6 is a flowchart showing processing according to the first embodiment, which is performed by the smart device 200 from when connection to the digital camera 100 via the wireless LAN is established to when image transfer is complete. Note that the processing shown in FIG. 6 is realized by the control unit 201 of the smart device 200 loading a control program, which has been read out from the nonvolatile memory 203, to the work memory 204, and executing the program. The same applies to FIGS. 7 and 8 described later.

In step S601, upon wireless LAN connection being established, the control unit 201 requests the thumbnails of in-camera images from the digital camera 100.

In step S602, the control unit 201 receives the thumbnails from the digital camera 100.

In step S603, the control unit 201 displays a list of the thumbnails received from the digital camera 100 on the display unit 206.

In step S604, the control unit 201 determines whether or not the thumbnail of an image that the user wishes to retrieve from the digital camera 100 has been selected from the list of thumbnails through a user operation. If a thumbnail has been selected, the control unit 201 displays, in step S605, a check mark on the thumbnail selected in step S604. If no thumbnail has been selected, the control unit 201 returns processing to step S603, and continues displaying the list of thumbnails.

In step S606, the control unit 201 determines whether or not the image acquisition button 221 shown in FIG. 3C has been pressed, thereby determining whether or not an image acquisition instruction given through a user operation has been received. If the image acquisition button 221 has been pressed, the control unit 201 determines that an image acquisition instruction has been received, and transmits an image transfer request to the digital camera 100 in step S607. If the image acquisition button 221 has not been pressed, the control unit 201 determines that an image acquisition instruction has not been received, and returns processing to step S603.

In step S608, the control unit 201 of the smart device 200 receives the image data requested in step S607, from the digital camera 100. Processing from step S607 to step S609 is repeated until all of the images selected in step S604 are transferred.

Figure 7:
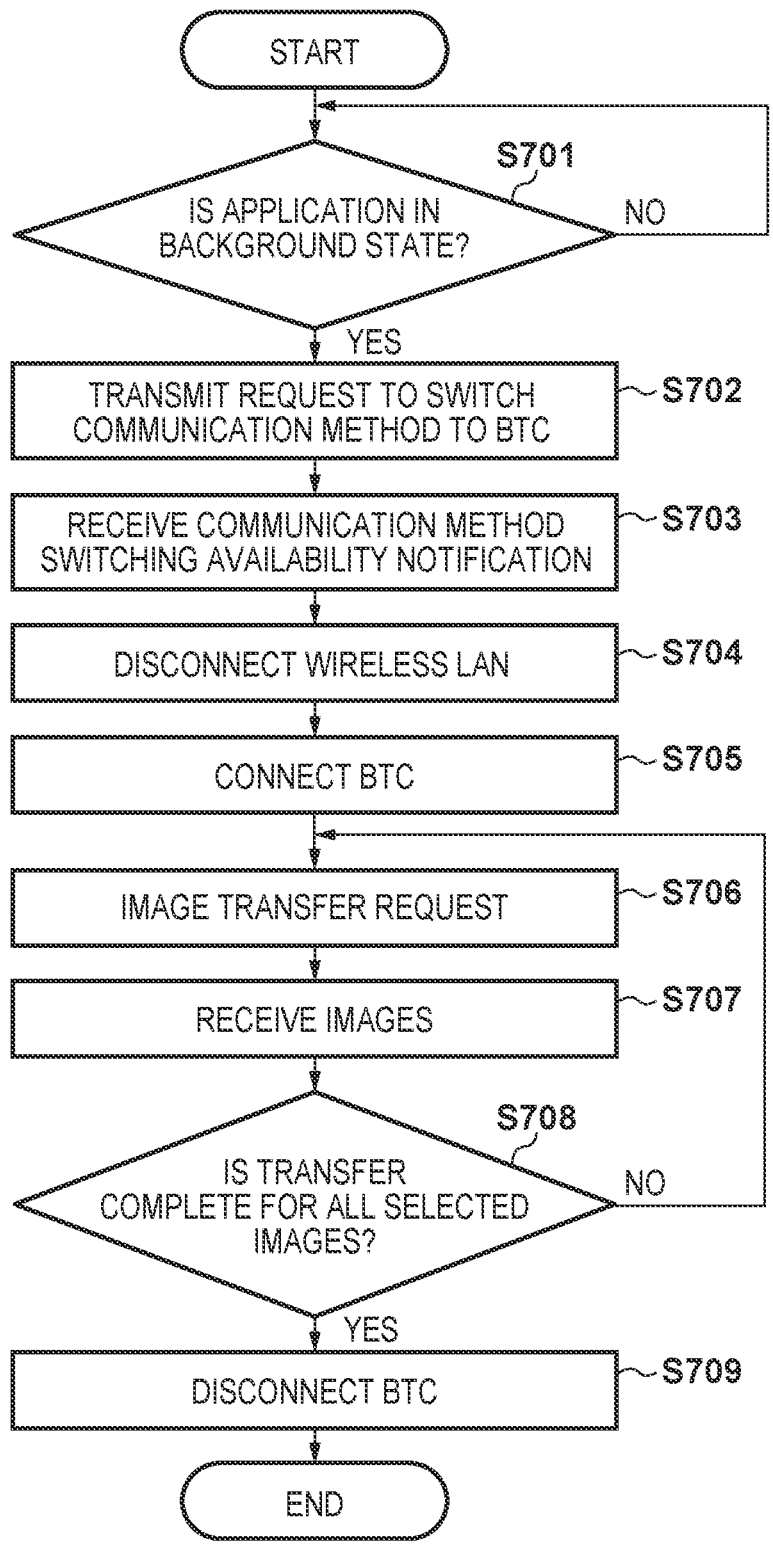
FIG. 7 is a flowchart for image transfer processing that is performed by the smart device according to the first embodiment.

FIG. 7 is a flowchart showing processing according to the first embodiment, which is performed by the smart device 200 when the camera application transitions to the background state during the image transfer.

In step S701, the control unit 201 performs determination regarding a transition of the state of the camera application. If the camera application is in the foreground state, the control unit 201 performs image transfer via a wireless LAN as described with reference to FIG. 5, and if the camera application has transitioned to the background state, the control unit 201 proceeds processing to step S702.

In step S702, the control unit 201 transmits a communication method switching request, which requests switching to the BTC communication method, to the digital camera 100. The digital camera 100, which has received the request for switching to BTC, determines whether or not it is possible to switch to BTC. If the digital camera 100 determines that it is possible to switch to BTC, the digital camera 100 transmits a communication method switching availability notification to the smart device 200.

Upon receiving the communication method switching availability notification from the digital camera 100 in step S703, the control unit 201 cuts the wireless LAN connection to the digital camera 100 in step S704. Upon cutting the wireless LAN connection, the control unit 201 establishes a BTC connection to the digital camera 100 in step S705, and transmits an image transfer request to the digital camera 100 in step S706. In step S707, the control unit 201 receives the image data requested in step S706, from the digital camera 100. In step S708, the control unit 201 determines whether or not all of the images in a transfer waiting have been transferred from the digital camera 100, and repeats processing from step S706 to step S707 until all of the images in the transfer waiting are transferred. Upon all of the images in the transfer waiting being transferred, the connection to the digital camera 100 via BTC is cut in step S709.

Figure 8:
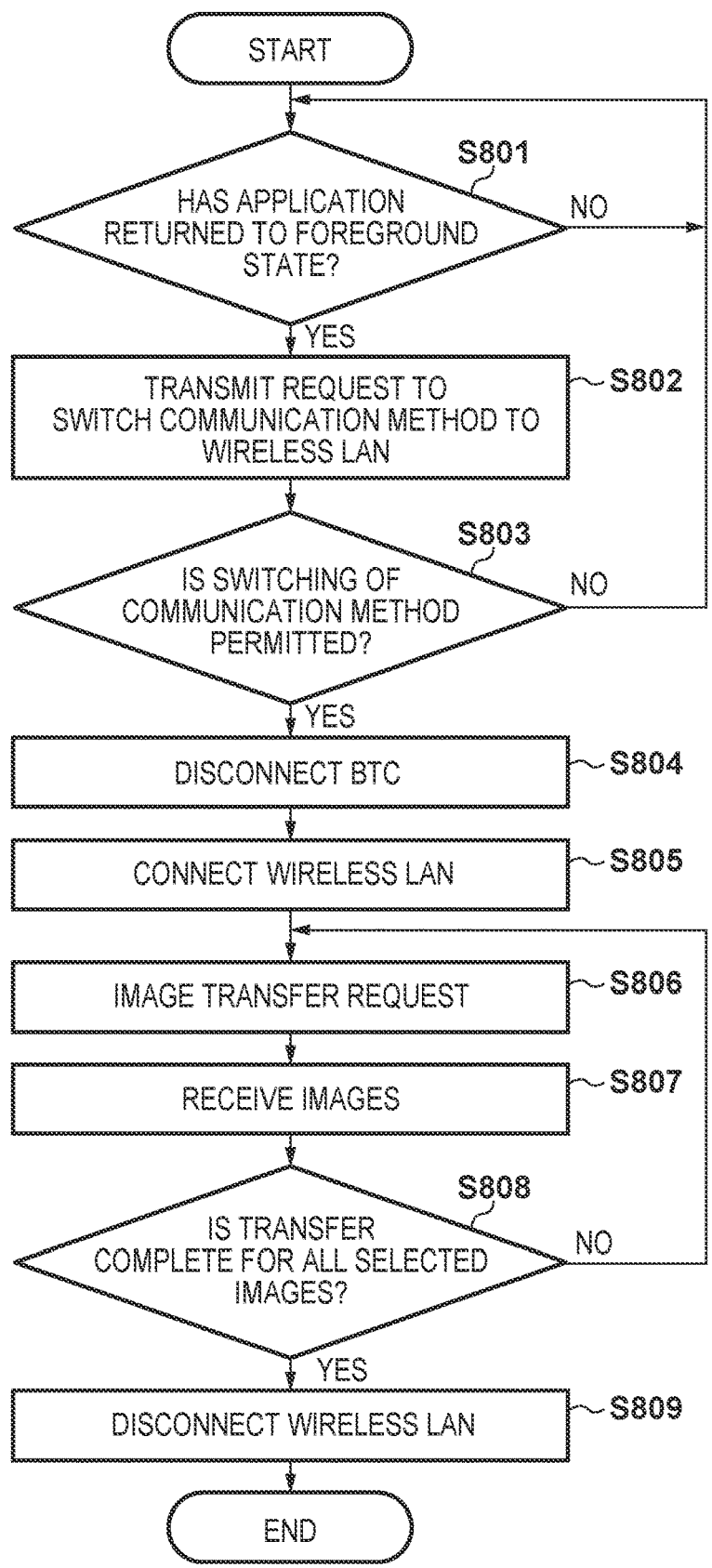
FIG. 8 is a flowchart for image transfer processing that is performed by the smart device according to the first embodiment.

FIG. 8 is a flowchart showing processing according to the first embodiment, which is performed by the smart device 200 when the camera application transitions from the background state to the foreground state.

In step S801, the control unit 201 determines the state transition of the camera application. If the camera application is in the background state, the control unit 201 performs image transfer via BTC as described with reference to FIG. 4, and if the camera application has transitioned to the foreground state, the control unit 201 proceeds processing to step S802. In step S802, the control unit 201 transmits a communication method switching request to the digital camera 100, which requests switching to the wireless LAN communication method.

In step S803, the control unit 201 determines whether or not the control unit 201 has received a communication method switching permission notification regarding switching to the wireless LAN communication method, from the digital camera 100. Upon receiving the communication method switching permission notification from the digital camera 100, the control unit 201 cuts the BTC connection in step S804, and switches connection to the digital camera 100 from BTC connection to wireless LAN connection in step S805. If the control unit 201 does not receives a communication method switching permission notification from the digital camera 100, the control unit 201 returns processing to step S801, and continues image transfer via BTC.

In step S806, the control unit 201 transmits an image transfer request to the digital camera 100. In step S807, the control unit 201 receives the image data requested in step S806, from the digital camera 100. In step S808, the control unit 201 determines whether or not all of the images in a transfer waiting have been transferred from the digital camera 100, and repeats processing from step S806 to step S807 until all of the images in the transfer waiting are transferred. Upon all of the images in the transfer waiting being transferred, the connection to the digital camera 100 via the wireless LAN is cut in step S809.

Figure 9:
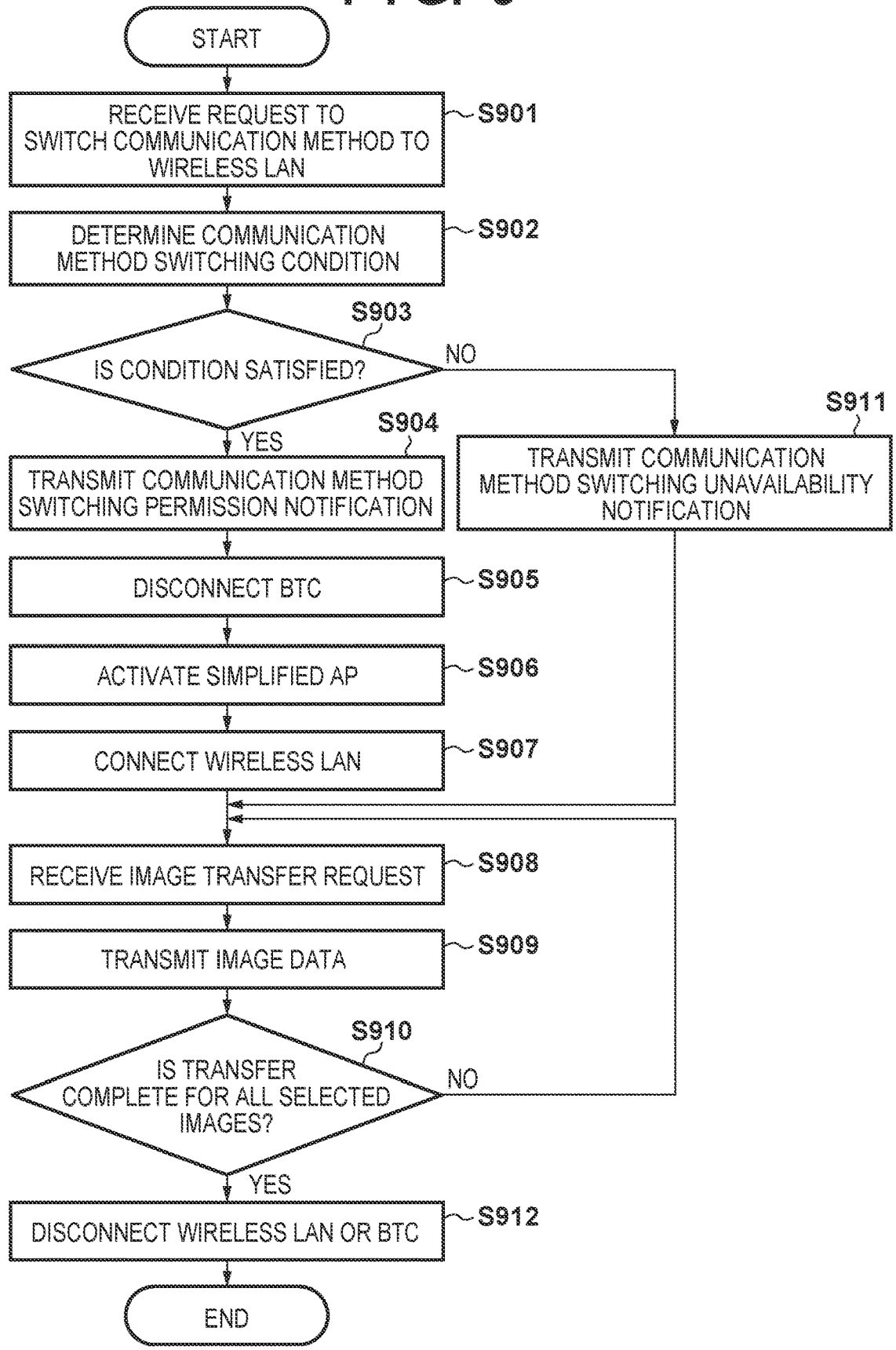
FIG. 9 is a flowchart for image transfer processing that is performed by the digital camera according to the first embodiment.

FIG. 9 is a flowchart showing processing according to the first embodiment, which is performed by the digital camera 100 when the camera application in the smart device 200 transitions from the background state to the foreground state. Note that the processing shown in FIG. 9 is realized by the control unit 101 of the digital camera 100 loading a control program, which has been read out from the nonvolatile memory 103, to the work memory 104, and executing the program. The same applies to FIG. 11 described later.

In step S901, the control unit 101 receives a communication method switching request, which requests switching to the wireless LAN communication method, from the smart device 200. In step S902, the control unit 101 performs determination regarding a condition for communication method switching.

Determination regarding the condition for communication method switching is performed using pieces of information such as the throughput of the wireless LAN, the throughput of BTC, the time required to switch from BTC to the wireless LAN, and the total amount of data of the remaining images that are to be transferred from the digital camera 100 to the smart device 200, as described below.

(1) The time required to switch from BTC to the wireless LAN+The time required to transfer the remaining images that are to be transferred, via the wireless LAN (calculated using the throughput of the wireless LAN)

(2) The time required to transfer the remaining images that are to be transferred, via BTC (calculated using the throughput of BTC)

The periods of time (1) and (2) are compared with each other, and a communication method that takes a shorter time is selected. If (1) is shorter, switching to the wireless LAN is performed, and if (2) is shorter, the BTC connection is maintained. If there are images that are currently being transferred, the control unit 101 waits until image data transfer is complete.

In step S903, if the condition for communication method switching is satisfied (transfer takes a shorter time if communication method is switch to the wireless LAN), the control unit 101 transmits a communication method switching permission notification to the smart device 200 in step S904. The control unit 101 cuts the BTC connection to the smart device 200 in step S905, activates the simplified AP of the wireless LAN in step S906, and establishes wireless LAN connection to the smart device 200 in step S907. In step S903, if the condition for communication method switching is not satisfied, the control unit 101 transmits a communication method switching unavailability notification to the smart device 200 in step S911.

In step S908, the control unit 101 receives an image transfer request from the smart device 200, and in step S909, the control unit 101 transmits image data thus requested, to the smart device 200. When performing image transfer in step S909, the control unit 101 uses the communication method that has been determined as satisfying the switching condition in step S903. In step S910, the control unit 101 repeats processing in steps S908 and S909 until all of the images in the transfer waiting, requested in step S908, are transferred. Upon image transfer being complete, the communication method determined as satisfying the switching condition in step S903 (the wireless LAN or BTC) is cut in step S912.

As described above, according to the present embodiment, while the camera application in the smart device 200 is performing image transfer in the background state, the user can connect to another network such as the Internet by operating another application. For example, the user can connect to the Internet via mobile data communication while operating another application, and therefore the user can retrieve images from a camera via BTC while operating an SNS application.

Second Embodiment

The second embodiment describes processing through which a simplified AP is activated before the BTC connection is cut in a case where the camera application transitions from the background state to the foreground state and the communication method is to be switched from the BTC communication method to the wireless LAN communication method.

Note that processing that is performed to transfer images from the digital camera 100 to the smart device 200, and processing that is performed when the camera application transitions to the background state are the same as those in the first embodiment.

Figure 10:
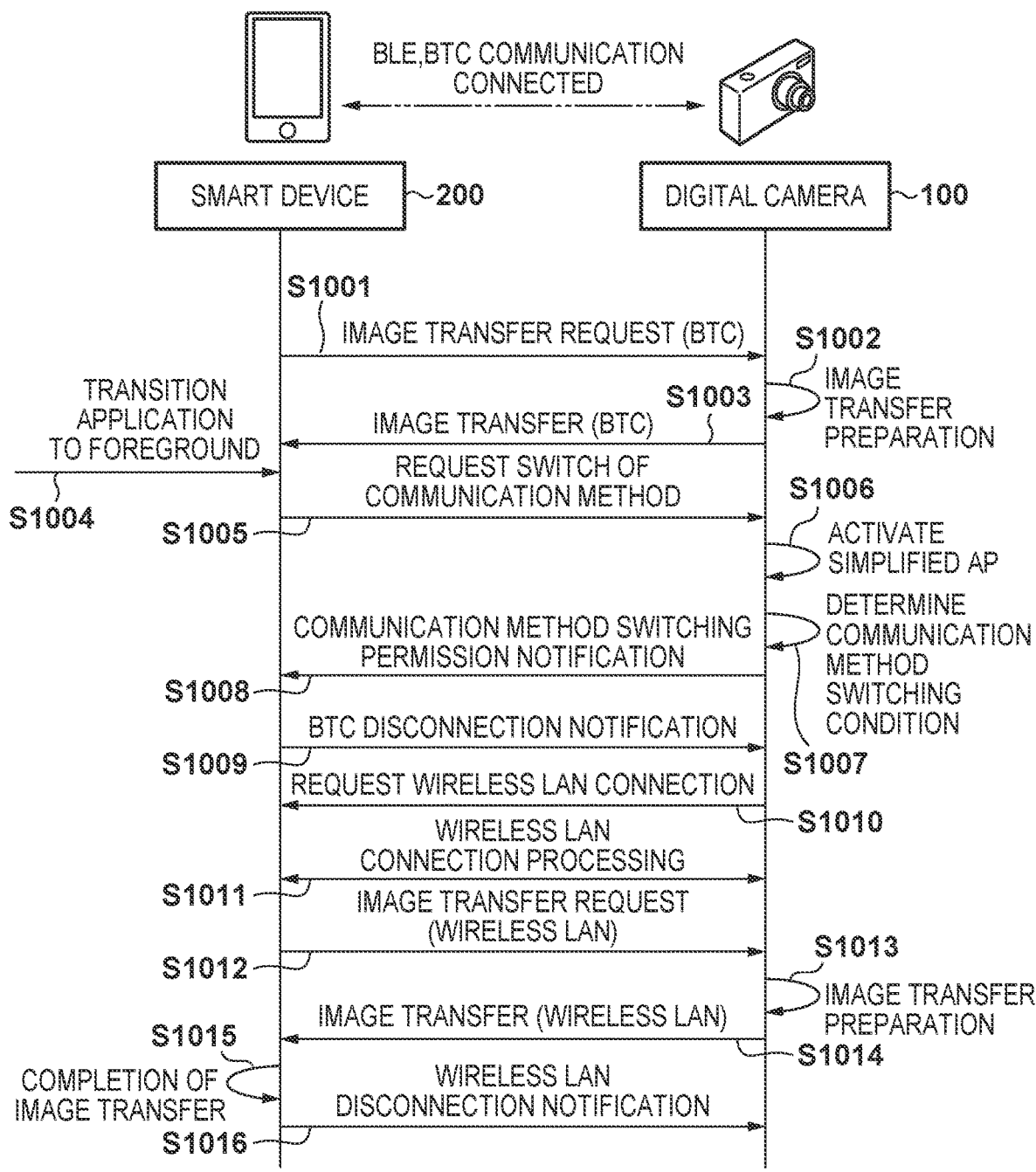
FIG. 10 is a sequence diagram for image transfer processing that is performed between a digital camera and a smart device according to a second embodiment.

FIG. 10 shows an image transfer processing sequence according to the second embodiment, which is performed between the smart device 200 and the digital camera 100 in a case where the camera application in the smart device 200 returns to the foreground state from the background state.

In the following description, it is envisaged that the smart device 200 and the digital camera 100 are already connected to each other via BLE and BTC, and image transfer is to be performed via BTC.

In step S1001, if there is an image in a transfer waiting, the smart device 200 transmits an image transfer request to the digital camera 100. In step S1002, the digital camera 100 prepares for image transfer, and in step S1003, the digital camera 100 transfers image data to the smart device 200. Processing from step S1001 to step S1003 is repeatedly performed until all of the images in the transfer waiting are transferred.

Upon the camera application returning to the foreground state in step S1004 as a result of a user operation, the smart device 200 transmits a communication method switching request, which requests switching to the wireless LAN communication method, to the digital camera 100 in step S1005. In step S1006, the digital camera 100, which has received the communication method switching request from the smart device 200, activates a simplified AP for a wireless LAN. In step S1007, as in step S506 in FIG. 5, the digital camera 100 performs determination regarding a condition for communication method switching. If the condition is satisfied, the digital camera 100 transmits a communication method switching permission notification to the smart device 200 in step S1008. The smart device 200, which has received the communication method switching permission notification from the digital camera 100, cuts the BTC connection in step S1009.

In step S1010, the digital camera 100 transmits a wireless LAN connection request to the smart device 200, and in step S1011, as in step S511 in FIG. 5, wireless LAN connection processing is performed. At this time, the simplified AP of the wireless LAN is already active. Therefore, it is possible to reduce the time required to complete wireless LAN connection processing. Upon wireless LAN connection processing being complete in step S1011, the smart device 200 transmits an image transfer request to the digital camera 100 in step S1012. The digital camera 100, which has received the image transfer request from the smart device 200, prepares for image transfer to the smart device 200 in step S1013, and transfers image data to the smart device 200 in step S1014. Processing from step S1012 to step S1014 is repeatedly performed until all of the images in a transfer waiting are transferred. Upon the digital camera 100 transferring all of the images in the transfer waiting in step S1015, the smart device 200 cuts the wireless LAN connection in step S1016.

FIG. 11 is a flowchart showing processing according to the second embodiment, which is performed by the digital camera 100 when the camera application in the smart device 200 returns to the foreground state from the background state. Note that, when the camera application is in the background state, image transfer is performed via BTC as described with reference to FIG. 4.

In step S1101, upon receiving a communication method switching request, which requests switching to the wireless LAN communication method, from the smart device 200, the control unit 101 activates a simplified AP for a wireless LAN in step S1102. It is envisaged that image transfer via BTC is continuing at this time.

In steps S1103 to S1106, as in steps S903 to S905 and S908 in FIG. 9, a communication method switching permission notification is transmitted to the smart device 200, and the BTC connection is cut, according to the result of determination regarding a condition for communication method switching.

In step S1107, the control unit 101 performs wireless LAN connection processing using the simplified AP activated in step S1102.

Steps S1109 to S1111 are similar to steps S908 to S910 in FIG. 9. Processing in steps S1109 and S1110 is repeatedly performed until all of the images in a transfer waiting requested in step S1109 are transferred. Upon image transfer being complete, the communication method determined as satisfying the switching condition in step S1103 (the wireless LAN) is cut in step S1112.

As described above, according to the present embodiment, the simplified AP of the digital camera 100 is activated when the camera application in the smart device 200 returns to the foreground state. Therefore, it is possible to reduce the time required to complete connection processing when performing communication method switching from the BTC communication method to the wireless LAN communication method.

Third Embodiment

The third embodiment describes the condition for communication method switching that is performed when the camera application according to the first and second embodiments returns to the foreground state from the background state.

Note that processing that is performed to transfer images from the digital camera 100 to the smart device 200, and processing that is performed when the camera application transitions to the background state are the same as those in the first embodiment.

The condition for communication method switching that is performed when the camera application returns to the foreground state from the background state may be the condition that a predetermined period of time has elapsed. Alternatively, in combination with the condition according to the second embodiment, when the camera application returns to the foreground state from the background state, one communication method may be switched to the other when a predetermined period of time has elapsed from when a simplified AP for a wireless LAN has been activated.

In a case where the camera application is repeatedly switched to the background state and the foreground state in response to user operations, it is possible to prevent switching between the communication methods from frequently occurring, by providing a predetermined wait time. In a case where applications are switched by the user, there is the possibility of switching frequently occurring due to, for example, the user selecting a wrong application.

Other Embodiments

Although examples of image transfer are described in the above embodiments, the present invention is not limited to image transfer. The present invention is applicable to any function provided by the digital camera 100, such as image shooting and image reproduction.

Also, in a case where the digital camera 100 and the smart device 200 are connected to each other via a wireless LAN that has a gateway function that enables them to connect to a different network such as the Internet, data transfer may be performed without switching the communication method even when the operations of the camera application transition to the background state.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-047182, filed Mar. 14, 2018 which is hereby incorporated by reference herein in its entirety.

What is claimed is:

1. A communication apparatus that wirelessly connects to a data transfer apparatus to perform communication therewith, comprising:
 a communication device configured to communicate with the data transfer apparatus using a plurality of communication methods that include a first communication method with which the communication device is unable to connect to a second network while connected to the data transfer apparatus via a first network, and a second communication method with which the communication device is able to connect to the second network while connected to the data transfer apparatus
 a processor configured to execute a communication application for data communication; and
 a communication controller configured to control the communication device,
 wherein the communication controller controls the communication device such that while the communication device is communicating with the data transfer apparatus by using one of the first communication method and the second communication method, the communication device is unable to communicate with the data transfer apparatus by using other of the first communication method and the second communication method, and while the communication apparatus is executing the communication application and is connected to the data transfer apparatus using the first communication method, the communication controller controls the communication device so as to switch from the first communication method to the second communication method upon the state of the communication application transitioning from a foreground state to a background state,
 wherein the communication device includes a first communication unit configured to perform communication using the first communication method and a second communication unit configured to perform communication using the second communication method, and
 in the communication controller, upon the state of the communication application transitioning to the background state, the first communication unit transmits to the data transfer apparatus a signal that requests switching to the second communication method, while connected to the data transfer apparatus and performing communication therewith using the first communication method.

2. The apparatus according to claim 1,
wherein, upon receiving a notification of permission from the data transfer apparatus in response to the signal that requests switching to the second communication method, the communication controller controls the communication device so as to switch from the first communication method to the second communication method.

3. The apparatus according to claim 1,
wherein the communication device further includes a third communication unit configured to perform communication using a third communication method with which the communication device is able to perform communication with lower power than with the second communication method.

4. The apparatus according to claim 1,
wherein the communication controller switches from the first communication method to the second communication method upon completion of data transfer from the data transfer apparatus that is connected to using the first communication method.

5. The apparatus according to claim 1,
wherein, when the communication apparatus is communicating with the data transfer apparatus connected thereto using the second communication method, upon the state of the communication application returning to the foreground state from the background state, the communication controller cuts connection to the data transfer apparatus established using the second communication method, and connects to the data transfer apparatus using the first communication method.

6. The apparatus according to claim 1,
wherein, when the communication apparatus is communicating with the data transfer apparatus connected thereto using the second communication method, upon the state of the communication application returning to the foreground state from the background state, the communication controller switches connection to the data transfer apparatus from the second communication method to the first communication method upon a predetermined period of time elapsing.

7. The apparatus according to claim 1,
wherein, when the state of the communication application is repeatedly switched to the foreground state and the background state during communication with the data transfer apparatus, the communication controller switches connection to the data transfer apparatus from connection using the second communication method to connection using the first communication method upon a predetermined period of time elapsing.

8. The apparatus according to claim 1,
wherein, when connection to the data transfer apparatus is to be switched between connection using the first communication method and connection using the second communication method, the communication controller switches to one of the communication methods upon completion of data transfer that is being performed at the time, so that transfer of remaining data can be performed.

9. A method of controlling a communication apparatus having a communication device configured to communicate with a data transfer apparatus using a plurality of communication methods that include a first communication method with which the communication device is unable to connect to a second network while connected to the data transfer apparatus via a first network, and a second communication method with which the communication device is able to connect to the second network while connected to the data transfer apparatus, the method comprising:
executing a communication application for data communication; and
controlling the communication device,
wherein the controlling is performed such that the communication controller controls the communication device such that while the communication device is communicating with the data transfer apparatus by using one of the first communication method and the second communication method, the communication device is unable to communicate with the data transfer apparatus by using other of the first communication method and the second communication method, and
while the communication apparatus is executing the communication application and is connecting to the data transfer apparatus using the first communication method, the communication device is controlled so as to switch from the first communication method to the second communication method upon the state of the communication application transitioning from a foreground state to a background state,
wherein the communication device includes a first communication unit configured to perform communication using the first communication method and a second communication unit configured to perform communication using the second communication method, and
upon the state of the communication application transitioning to the background state, the first communication unit transmits to the data transfer apparatus a signal that requests switching to the second communication method, while connected to the data transfer apparatus and performing communication therewith using the first communication method.

10. A non-transitory computer-readable storage medium storing a program for causing a computer to function as a communication apparatus that wirelessly connects to a data transfer apparatus to perform communication therewith, comprising:
a communication device configured to communicate with the data transfer apparatus using a plurality of communication methods that include a first communication method with which the communication device is unable to connect to a second network while connected to the data transfer apparatus via a first network, and a second communication method with which the communication device is able to connect to the second network while connected to the data transfer apparatus;
a processor configured to execute a communication application for data communication; and
a communication controller configured to control the communication device,
wherein the communication controller controls the communication device such that while the communication device is communicating with the data transfer apparatus by using one of the first communication method and the second communication method, the communication device is unable to communicate with the data transfer apparatus by using other of the first communication method and the second communication method, and while the communication apparatus is executing the communication application and is connected to the data transfer apparatus using the first communication method, the communication controller controls the communication device so as to switch from the first communication method to the second communication method upon the state of the communication application transitioning from a foreground state to a background state, wherein the communication device includes a first communication unit configured to perform communication using the first communication method and a second communication unit configured to perform communication using the second communication method, and upon the state of the communication application transitioning to the background state, the first communication unit transmits to the data transfer apparatus a signal that requests switching to the second communication method, while connected to the data transfer apparatus and performing communication therewith using the first communication method.

* * * * *